United States Patent
Petrov et al.

(10) Patent No.: US 12,322,139 B2
(45) Date of Patent: Jun. 3, 2025

(54) SYSTEM AND METHOD FOR CAMERA CALIBRATION

(71) Applicant: Basis Software, Inc., Redmond, WA (US)

(72) Inventors: Peter M. Petrov, Bellevue, WA (US); Olena Ivanovna Kobysh, Dnipropetrovsk Oblast (UA)

(73) Assignee: Basis Software, Inc., Redmond, WA (US)

( * ) Notice: Subject to any disclaimer, the term of this patent is extended or adjusted under 35 U.S.C. 154(b) by 145 days.

(21) Appl. No.: 18/115,492

(22) Filed: Feb. 28, 2023

(65) Prior Publication Data

US 2023/0274462 A1  Aug. 31, 2023

Related U.S. Application Data

(60) Provisional application No. 63/314,749, filed on Feb. 28, 2022.

(51) Int. Cl.
| | | |
|---|---|---|
| *G06T 7/80* | (2017.01) | |
| *G01S 17/86* | (2020.01) | |
| *G01S 17/89* | (2020.01) | |
| *G06T 7/13* | (2017.01) | |
| *G06T 7/90* | (2017.01) | |

(52) U.S. Cl.
CPC ............. *G06T 7/80* (2017.01); *G01S 17/86* (2020.01); *G01S 17/89* (2013.01); *G06T 7/13* (2017.01); *G06T 7/90* (2017.01); *G06T 2207/10028* (2013.01); *G06T 2207/20021* (2013.01)

(58) Field of Classification Search
CPC . G01S 17/86; G01S 17/89; G06T 7/13; G06T 7/80; G06T 7/90; G06T 2207/10028; G06T 2207/20021
See application file for complete search history.

(56) References Cited

U.S. PATENT DOCUMENTS

| | | | | |
|---|---|---|---|---|
| 4,439,157 A | * | 3/1984 | Breglia | G02B 27/0172 359/618 |
| 6,543,899 B2 | * | 4/2003 | Covannon | G02B 27/017 353/11 |

(Continued)

OTHER PUBLICATIONS

Castorena, Juan, Ulugbek S. Kamilov, and Petros T. Boufounos. "Autocalibration of lidar and optical cameras via edge alignment." 2016 IEEE International Conference on Acoustics, Speech and Signal Processing (ICASSP). IEEE, 2016.

(Continued)

*Primary Examiner* — Michael B. Pierorazio
(74) *Attorney, Agent, or Firm* — Lempia Summerfield Katz LLC

(57) ABSTRACT

Systems and methods are provided to generate on-site calibration parameters for improved calibration of a LIDAR/camera system. Data is acquired from two or more sensors (for example, a camera and a LIDAR scanner) used with a nodal camera rig or aligned in another way. Edges in the two sets of data are identified. The data is partitioned for example by using a grid. Offset vectors between the edges in the two sets of data are identified. Calibration parameters are generated based on the offset vectors.

19 Claims, 11 Drawing Sheets
(9 of 11 Drawing Sheet(s) Filed in Color)

(56) References Cited

U.S. PATENT DOCUMENTS

| | | | | |
|---|---|---|---|---|
| 6,652,104 B2* | 11/2003 | Nishida | | H04N 9/3185 |
| | | | | 353/69 |
| 6,877,863 B2* | 4/2005 | Wood | | H04N 9/3185 |
| | | | | 353/42 |
| 7,070,283 B2* | 7/2006 | Akutsu | | H04N 5/74 |
| | | | | 353/30 |
| 7,119,965 B1* | 10/2006 | Rolland | | G02B 27/0172 |
| | | | | 359/630 |
| 7,182,466 B2* | 2/2007 | Sunaga | | H04N 5/74 |
| | | | | 353/69 |
| 7,270,421 B2* | 9/2007 | Shinozaki | | G03B 21/142 |
| | | | | 353/121 |
| 7,359,575 B2* | 4/2008 | Bassi | | G06T 3/18 |
| | | | | 345/427 |
| 7,441,906 B1* | 10/2008 | Wang | | G03B 21/14 |
| | | | | 353/121 |
| 7,782,387 B2* | 8/2010 | Azuma | | H04N 25/68 |
| | | | | 359/662 |
| 8,676,427 B1* | 3/2014 | Ferguson | | G08G 1/0965 |
| | | | | 701/23 |
| 9,753,126 B2* | 9/2017 | Smits | | G01S 17/003 |
| 9,810,913 B2* | 11/2017 | Smits | | G02B 5/124 |
| 10,067,230 B2* | 9/2018 | Smits | | G01S 17/86 |
| 10,261,183 B2* | 4/2019 | Smits | | G01S 7/4868 |
| 10,379,220 B1* | 8/2019 | Smits | | G01S 7/4811 |
| 10,394,112 B2* | 8/2019 | Johnson | | A01M 1/223 |
| 10,473,921 B2* | 11/2019 | Smits | | G01S 17/87 |
| 10,591,605 B2* | 3/2020 | Smits | | G01S 17/42 |
| 10,663,626 B2* | 5/2020 | Benitez | | G02B 27/01 |
| 11,830,455 B2* | 11/2023 | Schriever | | G06F 3/16 |
| 2002/0051095 A1 | 5/2002 | Su | | H04N 9/3194 |
| | | | | 348/745 |
| 2002/0067466 A1* | 6/2002 | Covannon | | G02B 30/26 |
| | | | | 353/8 |
| 2002/0122161 A1* | 9/2002 | Nishida | | H04N 9/3194 |
| | | | | 353/70 |
| 2003/0191836 A1* | 10/2003 | Murtha | | H04L 67/02 |
| | | | | 709/224 |
| 2003/0210381 A1* | 11/2003 | Itaki | | H04N 5/74 |
| | | | | 353/70 |
| 2004/0156024 A1* | 8/2004 | Matsuda | | H04N 9/3185 |
| | | | | 353/70 |
| 2005/0046803 A1* | 3/2005 | Akutsu | | H04N 5/74 |
| | | | | 353/69 |
| 2005/0073661 A1* | 4/2005 | Tamura | | H04N 9/3194 |
| | | | | 353/70 |
| 2005/0151934 A1* | 7/2005 | Akutsu | | G03B 21/147 |
| | | | | 353/69 |
| 2005/0237492 A1* | 10/2005 | Shinozaki | | H04N 9/3185 |
| | | | | 353/69 |
| 2006/0098167 A1* | 5/2006 | Sato | | G03B 21/26 |
| | | | | 353/35 |
| 2006/0203207 A1* | 9/2006 | Ikeda | | H04N 9/3185 |
| | | | | 353/70 |
| 2007/0008344 A1* | 1/2007 | Medina | | G06T 15/10 |
| | | | | 345/647 |
| 2007/0257941 A1* | 11/2007 | Plut | | G06F 9/451 |
| | | | | 345/660 |
| 2007/0285626 A1* | 12/2007 | Miyasaka | | G03B 21/206 |
| | | | | 353/85 |
| 2009/0278999 A1* | 11/2009 | Ofune | | H04N 21/47 |
| | | | | 348/E3.048 |
| 2010/0002123 A1* | 1/2010 | Nozaki | | H04N 23/00 |
| | | | | 348/E5.022 |
| 2010/0045942 A1* | 2/2010 | Furui | | H04N 9/3194 |
| | | | | 353/69 |
| 2011/0085044 A1* | 4/2011 | Noda | | G03B 21/58 |
| | | | | 348/E5.133 |
| 2011/0210979 A1* | 9/2011 | Furui | | G03B 37/04 |
| | | | | 345/619 |
| 2011/0234994 A1* | 9/2011 | Uchiyama | | H04N 9/3185 |
| | | | | 353/121 |
| 2011/0285971 A1* | 11/2011 | Oka | | H04N 9/3185 |
| | | | | 353/70 |
| 2011/0292351 A1* | 12/2011 | Ishii | | H04N 9/3185 |
| | | | | 353/69 |
| 2013/0245877 A1* | 9/2013 | Ferguson | | G06V 20/56 |
| | | | | 701/23 |
| 2014/0303827 A1* | 10/2014 | Dolgov | | B60W 30/00 |
| | | | | 701/23 |
| 2015/0094897 A1* | 4/2015 | Cuddihy | | B60W 30/00 |
| | | | | 701/23 |
| 2015/0336502 A1* | 11/2015 | Hillis | | G05D 1/0088 |
| | | | | 701/23 |
| 2017/0240096 A1* | 8/2017 | Ross | | G05D 1/0212 |
| 2018/0158102 A1* | 6/2018 | Choi | | G06Q 30/0251 |
| 2020/0174130 A1* | 6/2020 | Banerjee | | B60R 11/04 |
| 2021/0004610 A1* | 1/2021 | Huang | | G01S 17/10 |
| 2021/0168440 A1* | 6/2021 | Ho | | H04N 21/43632 |
| 2021/0310823 A1* | 10/2021 | Wilbers | | G01C 21/387 |
| 2021/0341310 A1* | 11/2021 | Wilbers | | G01C 21/30 |
| 2022/0171412 A1* | 6/2022 | Cui | | G08B 3/10 |
| 2022/0201262 A1* | 6/2022 | Chen | | H04N 9/3185 |
| 2022/0242430 A1* | 8/2022 | Watano | | G06F 3/017 |
| 2023/0010713 A1* | 1/2023 | Park | | G01S 17/88 |

OTHER PUBLICATIONS

Park, Yoonsu, et al. "Calibration between color camera and 3D LIDAR instruments with a polygonal planar board." Sensors 14.3 (2014): 5333-5353.

* cited by examiner

SYSTEM AND METHOD FOR CAMERA CALIBRATION

CROSS-REFERENCE TO RELATED APPLICATION

This application is entitled to the benefit of and claims priority to U.S. Provisional Patent Application Ser. No. 63/314,749 filed Feb. 28, 2022 and entitled "LIDAR/COLOR CAMERA CALIBRATION IMPROVEMENT." The entire disclosure and contents of this prior filed application are hereby incorporated by reference herein in its entirety.

FIELD

The following disclosure relates to calibration of imaging devices.

BACKGROUND

As an increasing number of sensors and sensor modalities are used to acquire scenes, registration and/or combination of the acquired data from different modalities is becoming increasingly important. The combination of the different types of data provides complementary information about the environment or object being observed. An essential step in the process of combining data sets is calibration of the sensors or imaging devices in order to understand and interpret the intrinsic parameters or geometric parameters of each sensor or imaging device, such as position and orientation with respect to the other sensors or imaging devices. During registration, these calibration parameters are used to compute the geometric transformation that maps the output of each sensor to a common frame of reference.

An example of a system with multiple sensors is a nodal camera system. Such a system may include joint use of sensors such as a 3D Laser scanner (also known as light detection and ranging system or LIDAR) and a built-in or external color digital camera(s) replacing LIDAR on the same tripod and positioned such that the color image coordinate system center is sufficiently aligned with the LIDAR scan coordinate system center. The 3D Laser scanners are used to generate arrays of 3D points (referred to as "Point Clouds") that correspond to the scanned surface. Each point in the point cloud apart from 3D coordinates may include point intensity which reflects surface elements' reflectivity and often correlates with gray scale or red channel of the color image of the same surface. Color data from the digital camera may be applied to the points in the point cloud to allow rendering surfaces with captured color as well as the shape. As with other multiple modality systems, the two datasets must be registered or combined. In order to calculate a correspondence between a pixel(s) in a color image and a specific point(s) in the point cloud, a special set of parameters is calculated from the scan(s) and color images in a controlled setting that uses various types of calibration artifacts. These parameters may be referred to as camera calibration parameters and typically are obtained prior to shipping or deployment of the cameras/systems, for example, at a factory prior to shipping.

In an example, to perform calibration at the factory, a special setup may be used with multiple contrast targets or other setup that allows to correlate multiple points (features) in the scan space with corresponding points in color image from the camera. Centers of these targets can be found in software both in point cloud data and in color images and their relations may then be used to calculate camera calibration parameters. Calibration parameters may be not stable enough and may change between the time of factory calibration and time of the production project data acquisition or even between production shots. In addition, newer higher resolution digital cameras and sensors are more susceptible to small changes. Even the smallest change in calibration parameters—due to even small mechanical deformation, thermal drifts, or inaccurate reassembly of the lens with camera body—might make the factory calibration parameters insufficiently accurate for project goals.

SUMMARY

In an embodiment, a method is provided for re-calibrating a camera used in nodal camera/LIDAR system. Data is acquired from two or more sensors coupled with a nodal camera rig and tripod or other frame or mount. Initial mapping from color images to point cloud is generated using initial (factory) calibration parameters. Edges are identified in the data in color image(s) and in scan intensity image(s). The data is split into portions using a grid. Offsets vectors resulting in maximum correlation between edges in color images and edges in intensity images are calculated for each portion (grid cell). Certain filtering is applied to exclude areas (grid cells) that have no or too small number of edge points in the portion associated with the grid cell of either sensor or deemed incorrect by other criteria. For each retained grid cell some point in the point cloud within a grid portion is selected and associated with the pixel in the color image shifted by an offset vector. These pairs for each grid cell retained are used in the same way as color/intensity image markers' pairs are used in a factory calibration. New calibration parameters are calculated from the collected pairs such that when new parameters are applied to mapping, the new calculated offset vectors have smaller magnitudes. Typically, this is done using non-linear least square minimization, but other non-linear optimization methods may be used.

In an embodiment, a nodal camera system is provided. The nodal camera system includes a frame (e.g., tripod), a nodal camera rig, a LIDAR scanner, a high definition (HD) camera, and a processing unit. The nodal camera rig is mounted on the tripod in such a way that it can rotate the camera relative to a vertical or horizontal axis such that the rotation center will sufficiently coincide with the camera image center and with the LIDAR coordinate center if mounted interchangeably with the rig on the same tripod or other support mount/frame. This coincidence is important but not critical as more complex mapping algorithms will be applied. The LIDAR scanner is configured to acquire a 3D point cloud of an object or scene. While a center of a coordinate system and pitch (vertical inclination) angles are approximately known by the nodal camera rig design, the azimuthal angle may not be aligned between a camera and the LIDAR scanner and may need to be aligned. The camera is configured to acquire a two-dimensional (2D) color image(s) of the object or the scene at each selected rotation position of the rig. The processing unit is configured to provide calibration parameters so that output data from the LIDAR scanner and camera may be fused, registered, or combined into a single view. The processing unit is configured to calculate the calibration parameters by identifying edges in portions of the intensity image and color data and calculate offset vectors and point cloud/color image pairs therefrom.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Exemplary embodiments of the present invention are described herein with reference to the following drawings.

DETAILED DESCRIPTION

Embodiments described herein provide systems and methods to recalibrate a camera with a LIDAR scanner using an example of a nodal camera system. However, other camera systems may be used. Data is acquired from a first imaging device and a second imaging device. The sets of data are fragmented using, for example, a grid. Edges are identified in both sets of data. An initial mapping of the edges is determined using a prior determined calibration, for example using factory settings. A Fast Fourier Transform (FFT) algorithm may be used to calculate an offset vector with highest correlation between edges in the data sets. New calibration parameters are calculated by using offset vectors for each of the segments of the grid that are retained after filtering. In an embodiment, these steps may be repeated to improve the quality of the calibration by substituting the most recent determined calibration as the prior determined calibration.

The disclosed methods and systems provide advantages over algorithms that are using edge correlation work with external (extrinsic) camera calibration parameters, since the disclosed embodiments calibrate internal (intrinsic) parameters that usually require more points of correlations located in different areas of a camera field of view. In addition, the disclosed embodiments do not search correlations between extracted features that are present in color and in intensity images as done in typical controlled environment calibration and in published algorithms on Camera to LIDAR mapping calibration. Instead, the disclosed embodiments use the offset vectors of multiple patches, for example, assigned to some sample points in the patches.

Figure 1:
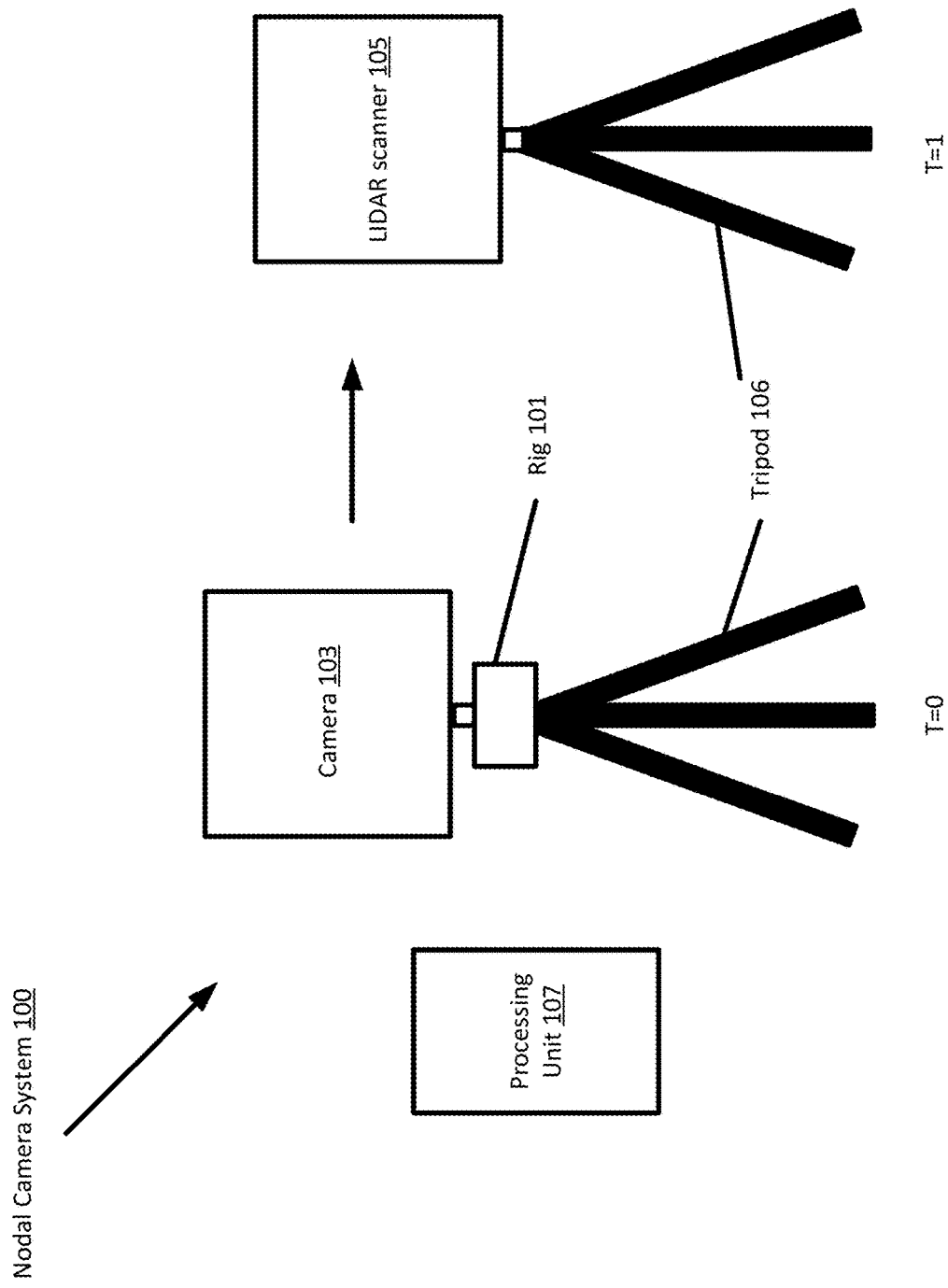
FIG. 1 depicts an example nodal camera system according to an embodiment.

FIG. 1 depicts an example nodal camera system 100. The nodal camera system 100 includes a rig 101 (also referred to as a nodal camera rig 101), a camera 103, a LIDAR scanner 105, and a processing unit 107. A tripod 106 or frame may be coupled with the nodal camera rig 101. Different sensors may be used or connected. In the following examples, the nodal camera system 100 includes a camera 103 and a LIDAR scanner 105, but alternative sensors or imaging devices may be used such as other types of cameras or ranging sensors. The camera 103 and LIDAR scanner 105 may be mounted or coupled at a same point on the rig 101 at different times (T=0, T=1). The camera 103 and LIDAR scanner 105 are removable so that only one of the two are attached to the tripod 106 at a single time. The nodal camera system 100 may be used to scan medium to large objects, e.g., cars, planes, ships, rooms, military equipment, and entire buildings. The nodal camera system 100 is configured to generate three-dimensional data, for example, in the form of a point cloud or a triangle mesh. Certain types of scanners also acquire color information for applications where this is important. Images/scans are brought into a common reference system, where data is merged into a complete model. The process of alignment, fusion, or registration may be performed during the scan itself or as a post-processing step. Calibration of the nodal camera system 100 may, for example, be performed at regular intervals, after a certain number of frames, or in response to a user request or based on the quality control process that evaluates match quality—for example by estimating offset vectors in the grids within overlapping color images.

The rig 101 is a mechanical device that mounts the camera 103 and/or the LIDAR scanner on a tripod 106 in such a way that for an initial position (and for every rotated position) a camera center is sufficiently close to a scanner coordinate system center (which is close to the mirror center) of the LIDAR scanner 105 mounted at a similar or same position after or before a series of images is taken with the camera 103 or ranging data is acquired by the LIDAR scanner 105. The rig 101 may be a single rig or may be two different rigs, for example, a camera rig and a LIDAR scanner rig. The rig 101 may only be for the camera. The LIDAR scanner may be attached to the tripod 106 using other coupling mechanisms. This mounting does not guarantee Lidar azimuth zero angle alignment with initial camera position but allows the camera to rotate around on its vertical or azimuth axis to several positions with reasonably good rotation angle accuracy and to rotate on an elevation angle to point possibly to multiple positions including, for example, to point directly to zenith or to nadir. The nodal camera rig 101 may be coupled with the camera 103 and tripod 106 using various attachments. The nodal camera rig 101 may also include or contain the processing unit 107 or be used with a processing unit offline (at a later time). Alternatively, the processing unit 107 may communicate directly with each of the sensors. The one or more sensors, for example the camera 103 and/or the LIDAR scanner 105, may be at specific elevations on the tripod 106. The location/attachment of the sensors affects the respective field of view of each respective sensor and thus when combining the output data of the sensors, the configuration of where each sensor is located affects the calibration process. In an example, a first sensor (e.g., camera 103) is attached at a location on the nodal camera rig 101 that is mounted on the tripod 106 or other mount or frame. In operation, the first sensor acquires data about a scene or object and then is replaced with a second sensor (e.g., LIDAR scanner 105) mounted on the same tripod 106 or other mount or frame instead of the camera rig 101 and camera 103 that acquires data about the scene or the object. The location of the sensors' centers, under ideal conditions, may be sufficiently coinciding. However, due to minute manufacturing errors, tolerances, drift, vibrations, or other movements, even with the factory/controlled calibration, the output data may not line up accurately enough. In an embodiment where the two sensors are moveable about the tripod 106, for example to set positions, or internal states of the camera changing due to thermal drifts, mechanical stresses or inaccuracy during reassembly, the recalibration process may need to be performed for each configuration.

The LIDAR scanner 105 is configured to generate a point cloud. LIDAR, also referred to as time of flight (ToF), laser scanners, laser radar, or 3D Laser Scanner, is a sensing method that detects objects and maps full 3D coordinates for object (scene) points scanned. In the LIDAR scanner 105, a laser device emits pulses (or modulated beams) of light to determine the range to a distant target. It also directs the pulse or beam over spherical angles and records the beam direction for each measured distance point. The distance to the target is determined by precisely measuring the time delay between the emission of the pulse and the detection of the reflected (backscattered) signal or by measuring the phase shift between outgoing and receiving signal. Characteristics of the reflecting objects that affect return intensity include the reflectivity of the material at the LIDAR wavelength, how smooth or rough the surface is, distance and the orientation of the surface relative to the beam incidence angle.

The LIDAR scanner 105 may detect objects at distances ranging from a few inches to more than 200 meters. LIDAR allows for extremely high-resolution 3D characterization of objects in a scene. Different types of LIDAR systems may be used such as solid state or mechanical devices. LIDAR may not provide color profiles of the object or scene being scanned with sufficient resolution or other required qualities. Thus, a secondary sensor such as a camera 103 may be used to capture color data with required qualities (or other data). The output image data and LIDAR data may be combined or fused to generate a more complete view of the object or scene. This may be referred to as color mapping, which involves processes of calculating transformations from image pixel coordinates (from image data of a camera) to 3D point coordinates in a point cloud generated from a scan (from a LIDAR system) and an inverse transformations from 3D point coordinates in a point cloud generated from a scan to camera image pixel coordinates.

The camera 103 is an imaging device configured to acquire digital images of a scene or object. The camera 103 may be high definition (HD) or standard definition. HD refers to the output image of the camera 103 which is of higher resolution and quality than standard definition. In an example, the camera 103 may provide a 60-megapixel equivalent color image or higher. Lower or higher resolution cameras may be used, for example, a 5-megapixel camera or 100-megapixel camera. The output of the camera 103 is one or more images that include a plurality of pixels. In an example operation, the nodal camera system 100 may be used to acquire an image and scan of an object or scene from a single position. In another example operation, the nodal camera system 100 may be used to acquire a series of images and scans at different locations around the object or scene. In this example, the camera 103 acquires a respective image at respective locations around the object or scene. The LIDAR scanner 105 (or other imaging device used with the nodal camera rig 101) also acquires data around the object or scene, either from a single location or multiple locations as described above. This may, for example, include acquiring image data of the object first using the camera 103 mounted on the nodal rig 101 mounted on a tripod 106 at a first location, replacing the camera rig 101 and camera 103 with the LIDAR scanner 105 on the tripod 106, and then acquiring ranging data using the LIDAR scanner 105 at the same first location. The camera data and the LIDAR data may then be combined to generate an image or view that contains more information than data from only one of the imaging/ranging systems used with the nodal camera rig 101.

The processing unit 107 is configured to perform the calibration process and color mapping process that will use calibration data to map color images onto the point cloud. The processing unit 107 may be or include a central processing unit (CPU), a graphics processing unit (GPU), or both. The processing unit 107 may be a component in a variety of systems. For example, the processing unit 107 may be part of a standard personal computer or a workstation. The processing unit 107 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processing unit 107 may implement a software program, such as code generated manually (i.e., programmed).

The processing unit 107 may include a memory that can communicate via a bus. The memory may be a main memory, a static memory, or a dynamic memory. The memory may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media, and the like. In one embodiment, the memory includes a cache or random-access memory for the processing unit 107. In alternative embodiments, the memory is separate from the processing unit 107, such as a cache memory of a processor, the system memory, or other memory. The memory may be an external storage device or database for storing data. Examples include a hard drive, compact disc ("CD"), digital video disc ("DVD"), memory card, memory stick, floppy disc, universal serial bus ("USB") memory device, or any other device operative to store data. The memory is operable to store instructions executable by the processing unit 107. The functions, acts or tasks illustrated in the figures or described herein may be performed by the programmed processing unit 107 executing the instructions stored in the memory. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing, and the like.

The processing unit 107 may further include a display unit, such as a liquid crystal display (LCD), an organic light emitting diode (OLED), a flat panel display, a solid-state display, a cathode ray tube (CRT), a projector, a printer or other now known or later developed display device for outputting determined information. The display may act as an interface for the user to see the functioning of the processing unit 107, or specifically as an interface with the software stored in the memory.

Additionally, the processing unit 107 may include an input device configured to allow a user to interact with any of the components of the nodal camera system 100. The input device may be a number pad, a keyboard, or a cursor control device, such as a mouse, or a joystick, touch screen display, remote control, or any other device operative to interact with the nodal camera system 100.

The processing unit 107 may also include a disk or optical drive unit. The disk drive unit may include a computer-readable medium in which one or more sets of instructions, e.g., software, can be embedded. Further, the instructions may embody one or more of the methods or logic as described herein. In a particular embodiment, the instructions may reside completely, or at least partially, within the memory and/or within the processing unit 107 during execution by the nodal camera system 100. The memory and the processing unit 107 also may include computer-readable media as discussed herein.

The present disclosure contemplates a computer-readable medium that includes instructions or receives and executes instructions responsive to a propagated signal, so that a device connected to a network can communicate voice, video, audio, images or any other data over the network. Further, the instructions may be transmitted or received over the network via a communication interface. The communication interface may be a part of the processing unit 107 or may be a separate component. The communication interface may be created in software or may be a physical connection in hardware. The communication interface is configured to connect with a network, external media, the display, or any other components in the nodal camera system 100, or combinations thereof. The connection with the network may be a physical connection, such as a wired Ethernet connection or may be established wirelessly. Likewise, the additional connections with other components of the system may be physical connections or may be established wirelessly.

The network may include wired networks, wireless networks, or combinations thereof. The wireless network may be a cellular telephone network, an 802.11, 802.16, 802.20, or WiMAX network. Further, the network may be a public network, such as the Internet, a private network, such as an intranet, or combinations thereof, and may utilize a variety of networking protocols now available or later developed including, but not limited to, TCP/IP based networking protocols.

In an embodiment, an initial calibration of the camera 103 is carried out by the processing unit 107 using a special calibration scene, in which targets are located in the form of rectangular markers or in other form that allows for the automatic extraction of the specific characteristic points from the intensity image and from color image. The mathematical model of the system calibration is based on finding correlations between target coordinates on camera images and three-dimensional target coordinates obtained from a LIDAR scan and a solution of the non-linear optimization problems that minimizes the mismatch of the coordinates of extracted targets' centers from the scan and centers of the corresponding points from the color images mapped to intensity image space. To recalibrate the camera 103 by production images (that is, from scenes that do not have special targets included) and refine the calibration parameters it is necessary to have a set of correction vectors for patches of the camera images and intensity images mapped to the same coordinate system (space) associated with three-dimensional coordinates of sample point in the patch. Therefore, when preparing for recalibration of the camera 103 it may be necessary to solve the problem of finding points on production images of the camera 103 and their three-dimensional projections on the LIDAR scan according to the available initial calibration parameters of the camera 103.

The processing unit 107 is configured to acquire data from each of the sensors (e.g., the LIDAR scanner 105 and the camera 103) in the form of a first data set and a second data set. The processing unit 107 is configured to generate an intensity image from the LIDAR data. The processing unit 107 is configured to map the intensity image from the LIDAR data and color data from the camera data to the same coordinate system, for example a coordinate system of the intensity image. The processing unit 107 is configured to identify edges in each of the data sets—either before mapping to the same coordinate system or after. The processing unit 107 is further configured to split each of the data sets using a grid or other partitioning method into different cells or partitions. Certain cells or areas may be excluded based on the content of the respective cells. In an example, cells that do not include physical edges (e.g., cells associated with an image of the sky) may be excluded as they lack edges that may be correlated between the data sets. The edges from the data sets for each cell are correlated to calculate offset vectors. The offset vectors are used to calculate calibration parameters such that when used to map color and intensity to a common coordinate system, the offset vectors are minimized, ideally making offset vectors null (all zeroes). This process may be performed at any time after acquisition of at least some data from the sensors. The process may be repeated. In addition, the process may be performed during or after acquisition of the sensor data.

Figure 2:
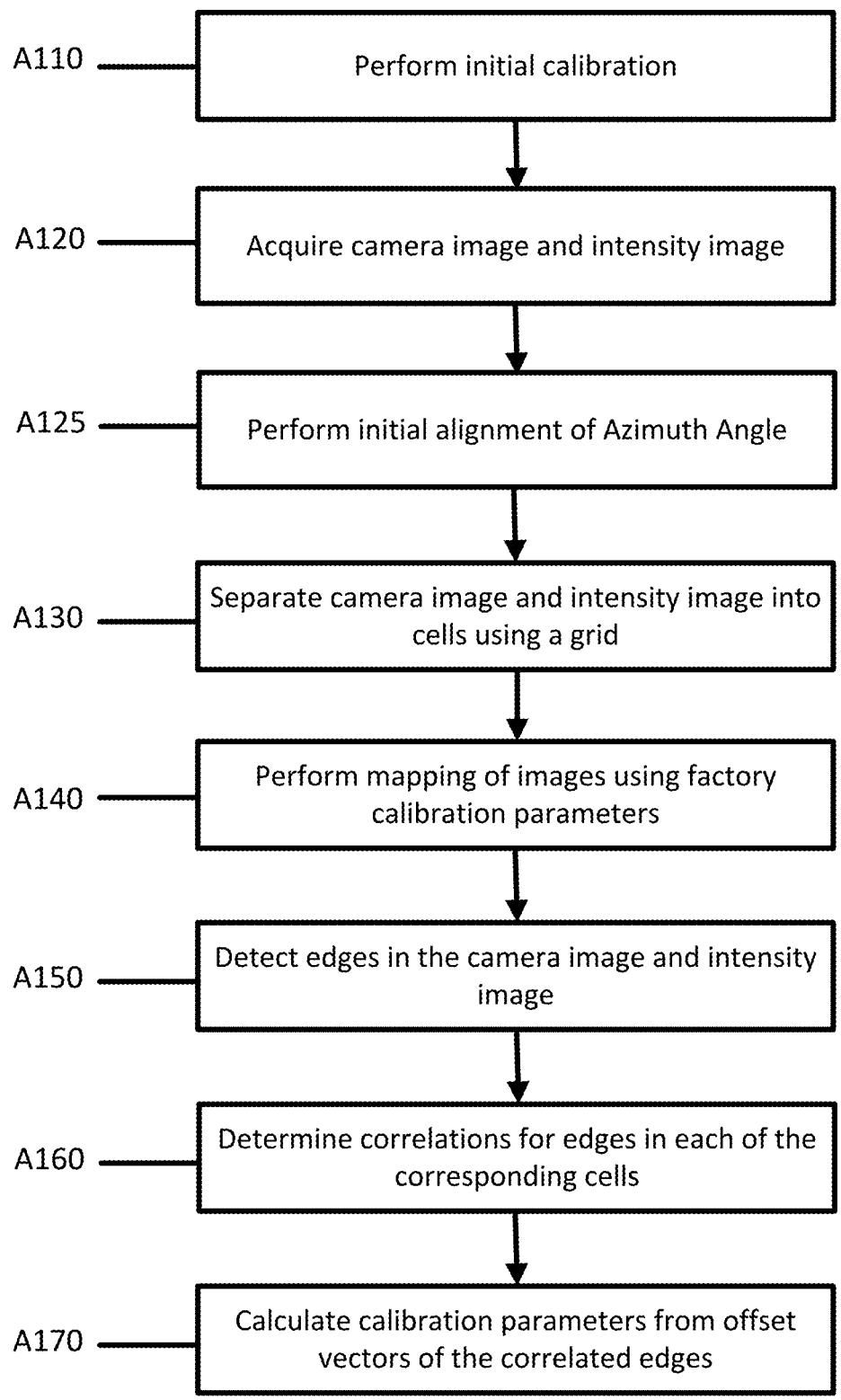
FIG. 2 depicts an example method for calibration of a nodal camera system according to an embodiment.

FIG. 2 depicts an example method for on-site calibration of a nodal camera system 100 using the system of FIG. 1. The on-site calibration process uses the correlation between edges in a point intensity image (e.g., from the LIDAR data) and edges in a color image (e.g., from the camera data) to calculate offset vectors that may be used to register/align/fuse the two different types of data acquired from the different imaging devices/sensors. Additional, different, or fewer acts may be provided. The acts are performed in the order shown or other orders. The acts may also be repeated. Certain acts may be skipped. The calibration process is a process of finding the values of the internal and external calibration parameters that minimizes the discrepancy between features on the color images and features on the LIDAR scan.

Figure 3A:
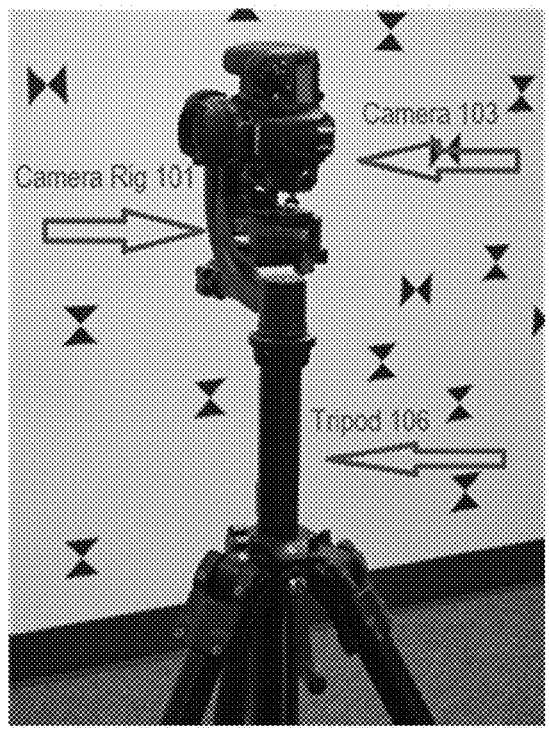
FIG. 3A depicts an example of a nodal camera rig with a mounted camera to be calibrated on a tripod that further mounts a LIDAR scanner at a later time or an earlier time according to an embodiment.
Figure 3B:
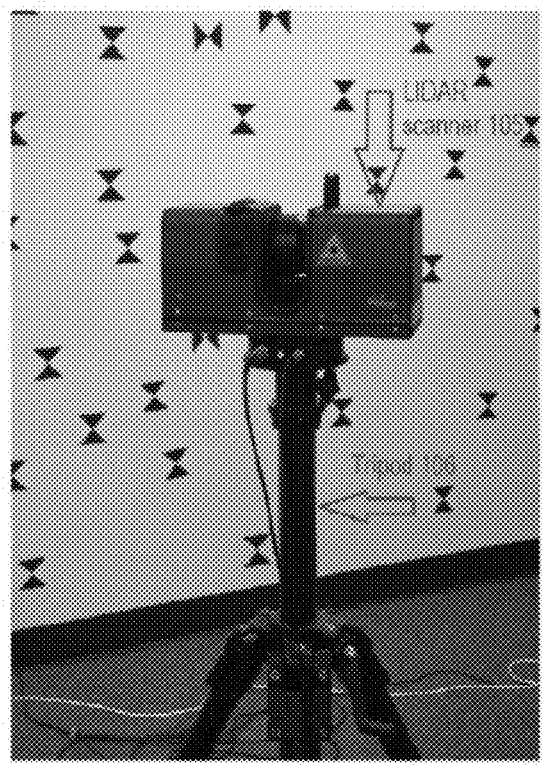
FIG. 3B depicts an example of the tripod of FIG. 3A with a mounted LIDAR scanner instead of the nodal camera rig and camera according to an embodiment.
Figure 3C:
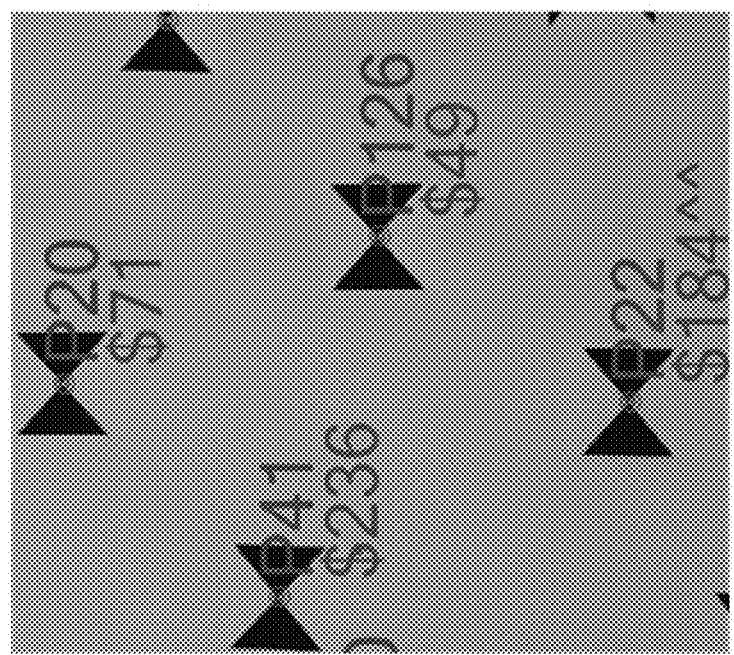
FIG. 3C depicts an example factory calibration scene fragment with markers extracted in both intensity and color space.
Figure 4A:
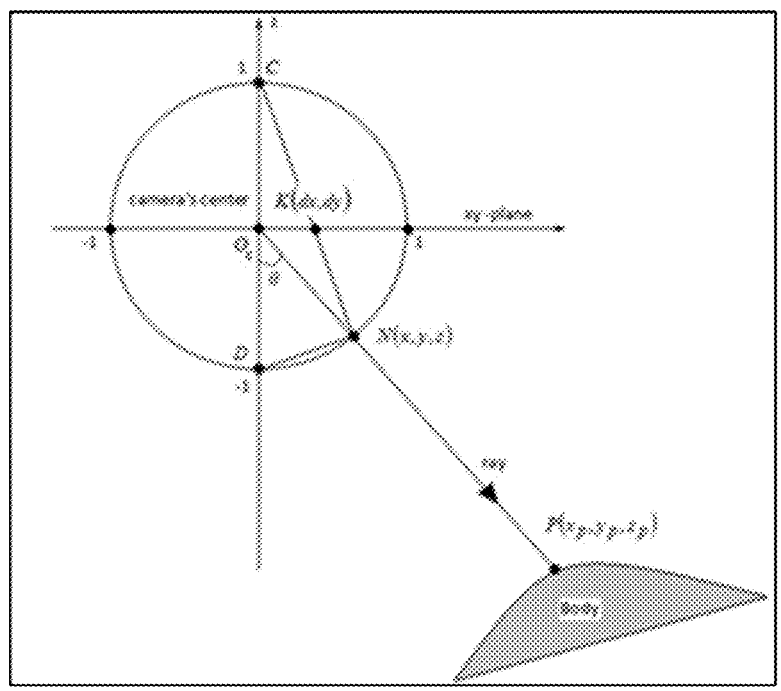
FIG. 4A depicts an example of mapping a point of a scene to an image plane in a camera coordinate system.
Figure 4B:
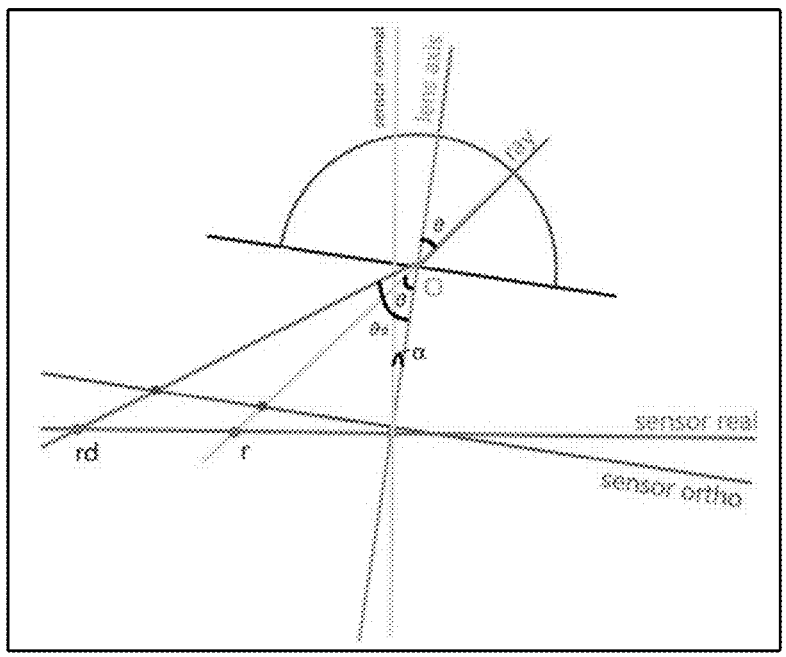
FIG. 4B depicts an example of the tilt of a camera lens optical axis relative to camera sensor normal at angle α.

At act A110, an initial calibration of the nodal camera system 100 is performed. In an embodiment, the nodal camera system 100 is configured to perform camera calibration at a factory using a controlled environment. For factory calibration a scene that includes multiple contrast markers (targets) may be used. Software can automatically extract both 3D coordinates of the contrast markers' centers from the 3D scan and pixel coordinates of contrast markers' centers from color images. FIG. 3A depicts an example tripod 106 with a nodal camera rig 101 coupled with a camera (e.g., Nikon® DSLR) 103. FIG. 3B depicts an example scanner (LIDAR) 105 (e.g., Surphaser® scanner) mounted on the tripod 106 instead of the camera rig 101 with the Nikon® DSLR camera 103 as shown in FIG. 3A. FIG. 3C depicts an example color image fragment of the scene with markers extracted from a color image (Green) and a scan (Red). Having the markers extracted from color images mapped to 3D coordinates in a scan coordinate system allows for calculating the discrepancy (distance) between markers from color images and from the scan mapped to the same coordinate system. A non-linear optimization may be performed to select parameters that minimize the discrepancy. In this way, the calibration process is essentially a process of finding these parameters. The essence of the camera calibration process is to build a projection operator Pr(u, v) (internal calibration) and the camera position matrix Calib (external calibration). Construction of the projection operator Pr(u, v) is performed according to the mathematical model based on an Equisolid Mapping Function but may be adopted to different mapping functions for different lens models. FIG. 4A depicts an example of mapping a point of a scene to the image plane in a camera coordinate system. The lens axis here points to a negative Z axis direction. FIG. 4B depicts an example of the tilt of the camera lens optical axis relative to the camera sensor normal at angle α.

The procedure uses a Cartesian coordinate system (scan coordinate system) $\langle O_s, r_{x,s}, r_{y,s}, r_{z,s} \rangle$, where $r_{x,s}, r_{y,s}, r_{z,s}$ are the unit vectors of respective axes, and the point $O_s$ is the center of the scan coordinate system. Similarly, $\langle O_c, r_{x,c}, r_{y,c}, r_{z,c} \rangle$ is the Cartesian coordinate system of the camera 103.

Then, according to the selected mathematical model of the camera 103, the point P corresponds to the point N(x, y, z) (see FIG. 4A) on the unit sphere with the center at zero of the camera coordinate system. In its turn, a point N corresponds to a point K(dx,dy) on the xy picture-plane of the camera 103 via projection that can be described by one of mapping functions selected for the specific lens model.

The calibration process is based on the correspondence between centers of contrast markers on camera images and on scan intensity images. The initial calibration process is important as the later or subsequent calibration process described below only works if the initial calibration is accurate enough so that the grid cells for the camera data and LIDAR data will sufficiently overlap some scene fragment. Without the initial calibration the grid cells may not be correlated between a cell of the camera image and a cell of the intensity image derived from the LIDAR. While it still may be possible to find correlation in certain scenarios, the process involves further computations and calculations.

At act A120, imaging data is acquired from an imaging device, such as a camera 103, and point cloud data is acquired from a ranging sensor, for example a LIDAR scanner 105. In an embodiment, the camera 103 acquires data about an object or scene while attached to a nodal camera rig 101 mounted on a tripod 106. The LIDAR scanner 105 acquires data about the scene or the object while attached to the tripod 106 at or about the same elevation as the camera 103 mounted on the nodal camera rig 101 mounted on the same tripod 106 at the same location. The data is acquired subsequently. For example, the camera 103 mounted on a rig 101 acquires data and then the rig 101 and camera 103 are replaced by the LIDAR scanner 105 which then acquires data (or vice versa). The camera image may be a 2D image including a grid of pixels. The point cloud data is transformed into 2D intensity image. The intensity image may be black and white or greyscale.

In a further step A125, an initial alignment is found. As the camera rig 101 does not guarantee initial alignment of the camera lens horizontal direction with scan coordinate azimuth axis it may be necessary to find an initial alignment. Determining the initial alignment may be done either manually by selecting a matching feature on the scan intensity image and on the color image or, for example, by an automatic correlation search.

The following acts A130-A150 may be different in various implementations. In an example, the separating of act A130 may be performed after the edge detection of Act A150. Acts A130-A150 do need to be performed prior to act A160 to provide a sufficient overlap between content in cells with edges in intensity and color image.

At act A130, the camera image and the intensity image are separated into distinct regions, for example by using a grid. The camera image and intensity image are split into a grid, each cell of which is considered as a separate sub-image. The grid cell size may be defined as $2^N$ pixels, where N is an integer. A standard size of a base grid cell may be, for example, 256×256 pixels but may be adjusted to select the best grid for specific scene. This step may also be performed subsequent to or simultaneously with the edge detection of act A150. In an embodiment, a filtering step may be performed on the cells of the grid to exclude cells that may not be useful or damaging to the calibration quality. Example of filtering may be exclusion of areas that do not have any point data, for example a patch that includes only sky. Other criteria may be used to determine if the offset vector from a specific patch is used in calculations (another example may be a patch that contains no edges in either or both color and intensity data or is too noisy).

At act A140, an initial mapping is performed for each of the cells of the grid between the camera image and the intensity image using a previous calibration dataset, for example the calibration dataset that is computed at act A110. The camera image may be mapped to the intensity image. The intensity image may be mapped to the camera image. Both may be mapped to a common coordinate system. The previous calibration dataset may use factory provided calibration parameters. The previous calibration dataset may also use previously calculated on-site calibration parameters if the calibration process has been previously performed. For example, for a first iteration, the factory or initial calibration computed at act A110 may be used. For subsequent iterations, the prior calibration parameters calculated at act A170 described below may be used. Alternatively, the initial mapping can be performed after act A150 by mapping the image with edges from intensity image to image with edges from the color image.

At act A150, an edge detection algorithm is applied to the color data and the scan intensity image to identify edges. If performed subsequent to acts A130, the edge detection algorithm may be performed cell by cell for each of the camera image and the intensity image. Any cells that have been filtered out may be excluded or skipped before or after the edge detection process. In an embodiment, each camera image in gray scale or in some selected color (for example Red) representation is processed to select the edges and obtain an image with edges. For the imaging data from the camera 103, the edges may be determined by identifying edges of objects using pixel values. For the intensity image data that is derived from the point cloud, a 2D image or view may be generated and the intensity values of pixels may be used to identify edges. Different edge detection algorithms may be used—for example Canny edge detection, thresholding, edge thinning, image gradients, among others. Accuracy of the recalibration may depend on the edge detection algorithm and on filters applied to an image with edges to reduce noise. In addition, for all 3D points that are within the field of view of the image edges are also identified. As a result, two sets of images with edges are obtained: 1) the edges obtained from the camera images and the edges projected onto the camera images from the intensity channel of scan 3D points or 2) edges from the intensity image and edges from the camera image projected onto the intensity image.

Figure 5:
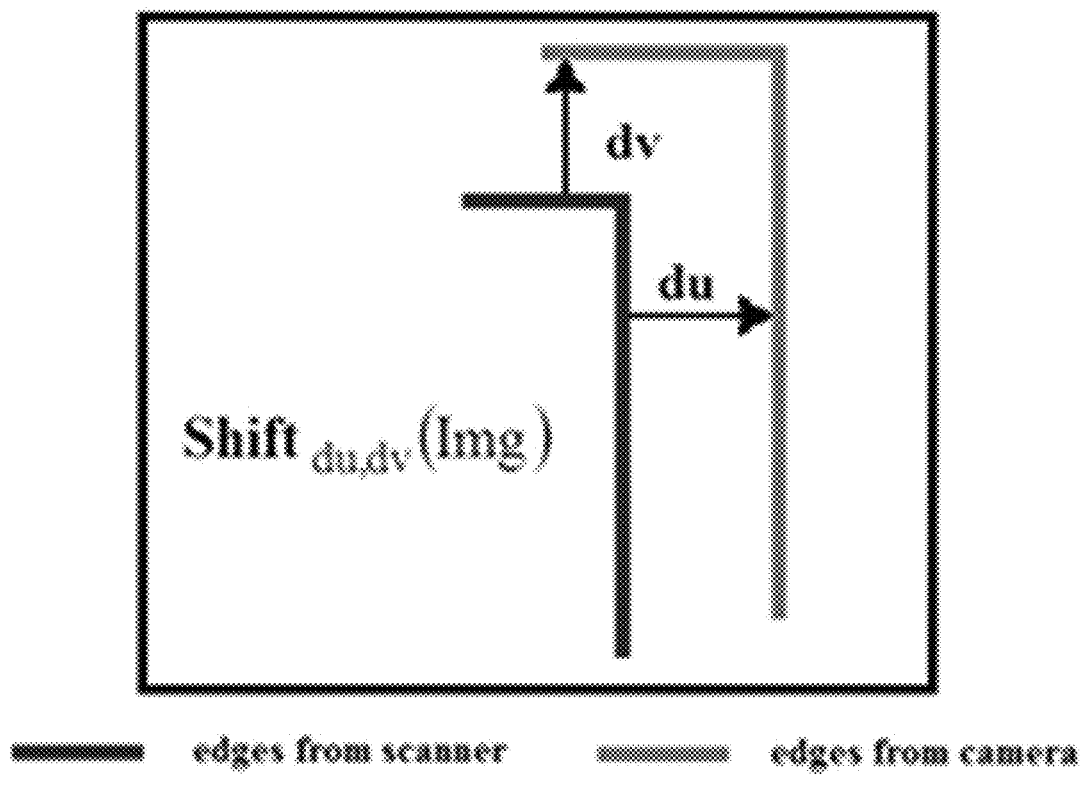
FIG. 5 depicts an example of edge images that shows offset vectors within grid cells between color image edges and intensity image edges according to an embodiment.

At act A160, the correlations between the edges in the imaging data and the point cloud data are calculated for each corresponding cell that was initially mapped at act A140. FIG. 5 depicts a portion of an image with edges from the scanner and edges from the camera 103 shown. The Shift du,dv is determined using, for example, Fast Fourier Transform (FFT). FFT is an algorithm that computes the discrete Fourier transform (DFT) of a sequence. Phase correlation may be used to estimate the relative translative offset vector. Phase correlation is based on the translation property of Fourier transform (FT), which states that a shift of two relevant images in the spatial domain is transformed into the frequency domain as phase differences. A window function (e.g., a Hamming window) is applied to both data sets to reduce edge effects (this may be optional depending on the image characteristics). Then the discrete 2D Fourier transform of both images is calculated. Alternatively, cross correlation may be used. Cross correlation finds the degree of similarity between two images or templates. The FT of the correlation of two images is the product of the FT of one image and the complex conjugate of the FT of the other.

Figure 6:
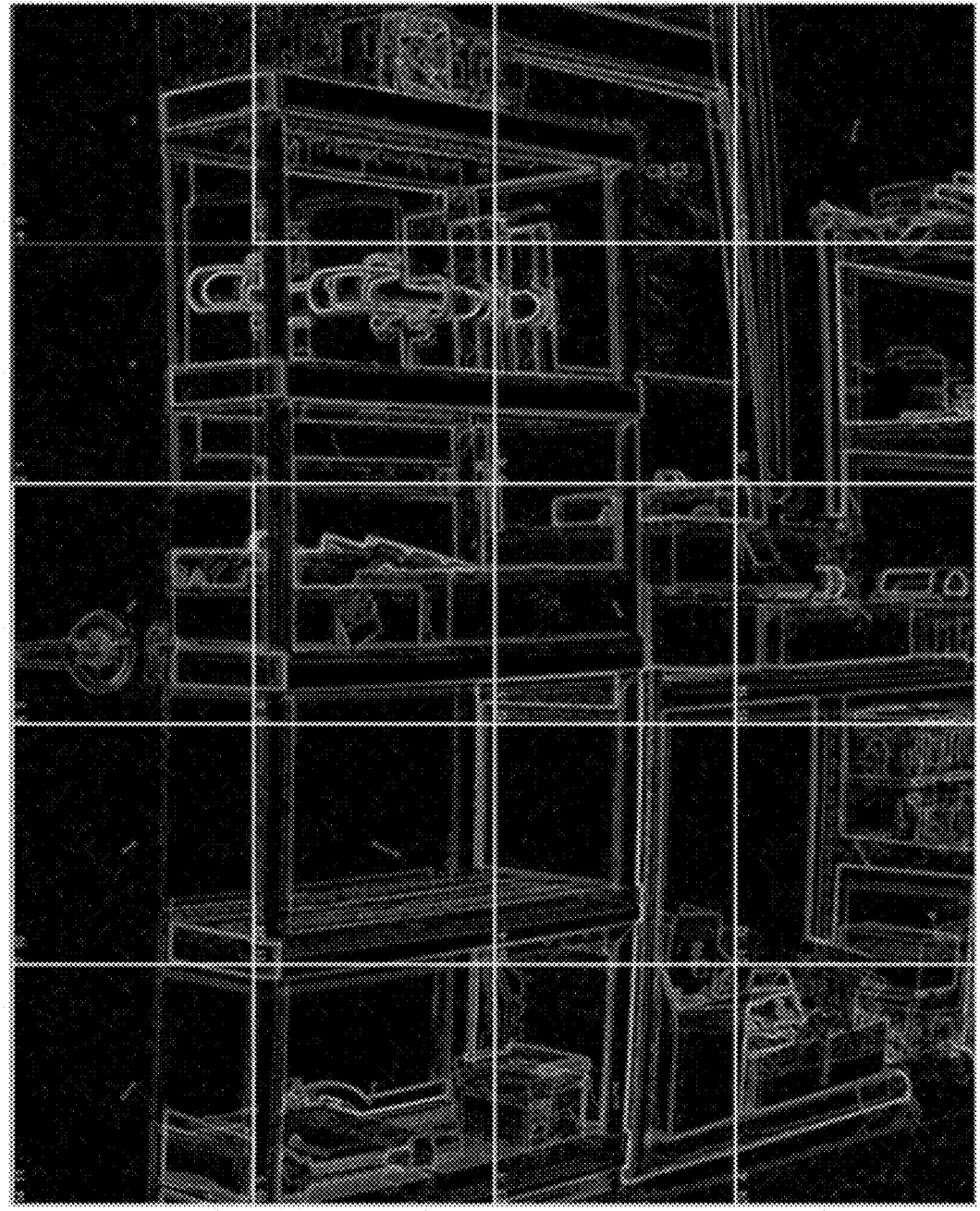
FIG. 6 depicts an example of edges that show offset vectors within grid cells and corresponding offset vectors before recalibration of the images according to an embodiment.
Figure 7:
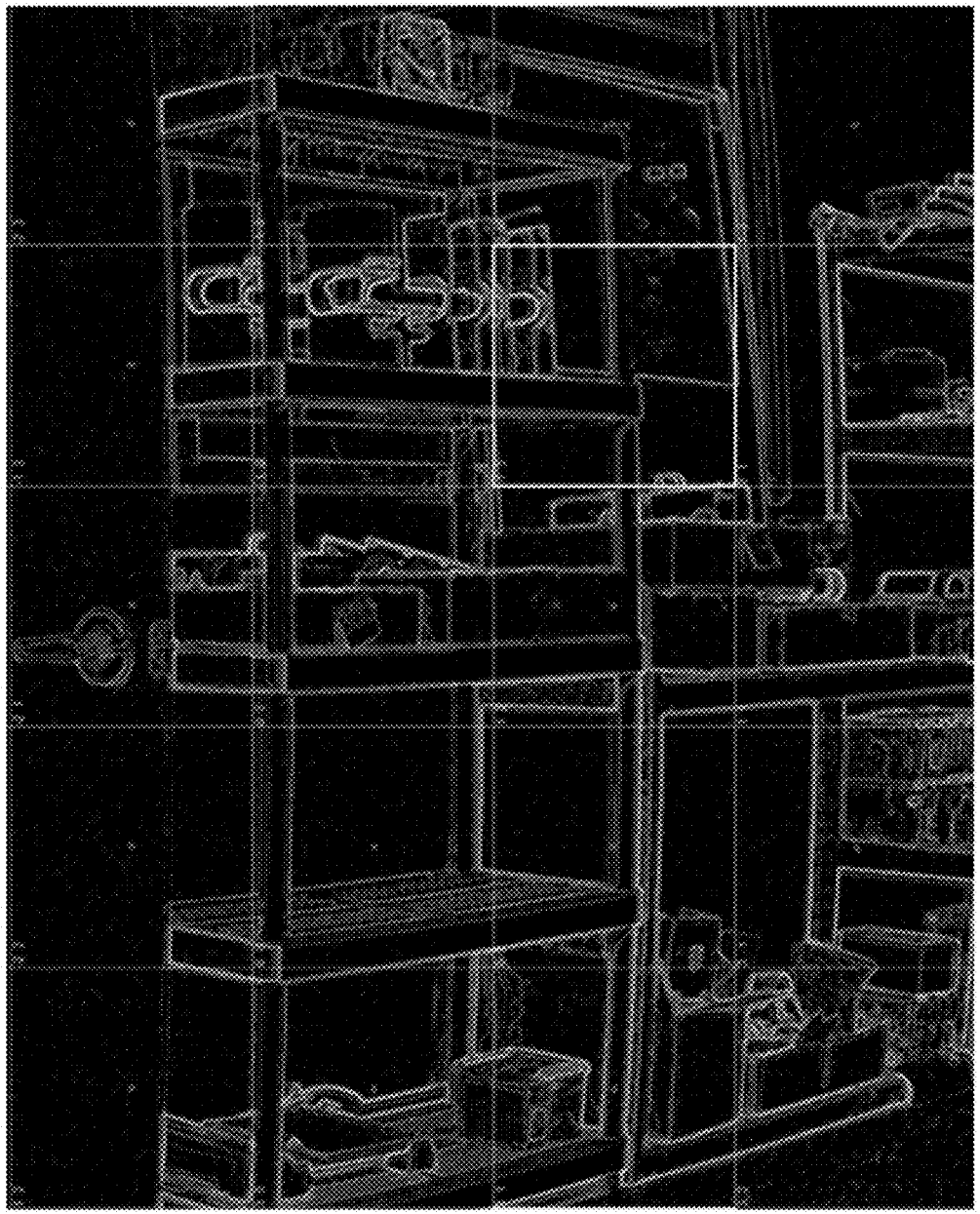
FIG. 7 depicts an example of finding displacements on a base grid of 256 pixels after a first recalibration according to an embodiment.
Figure 8:
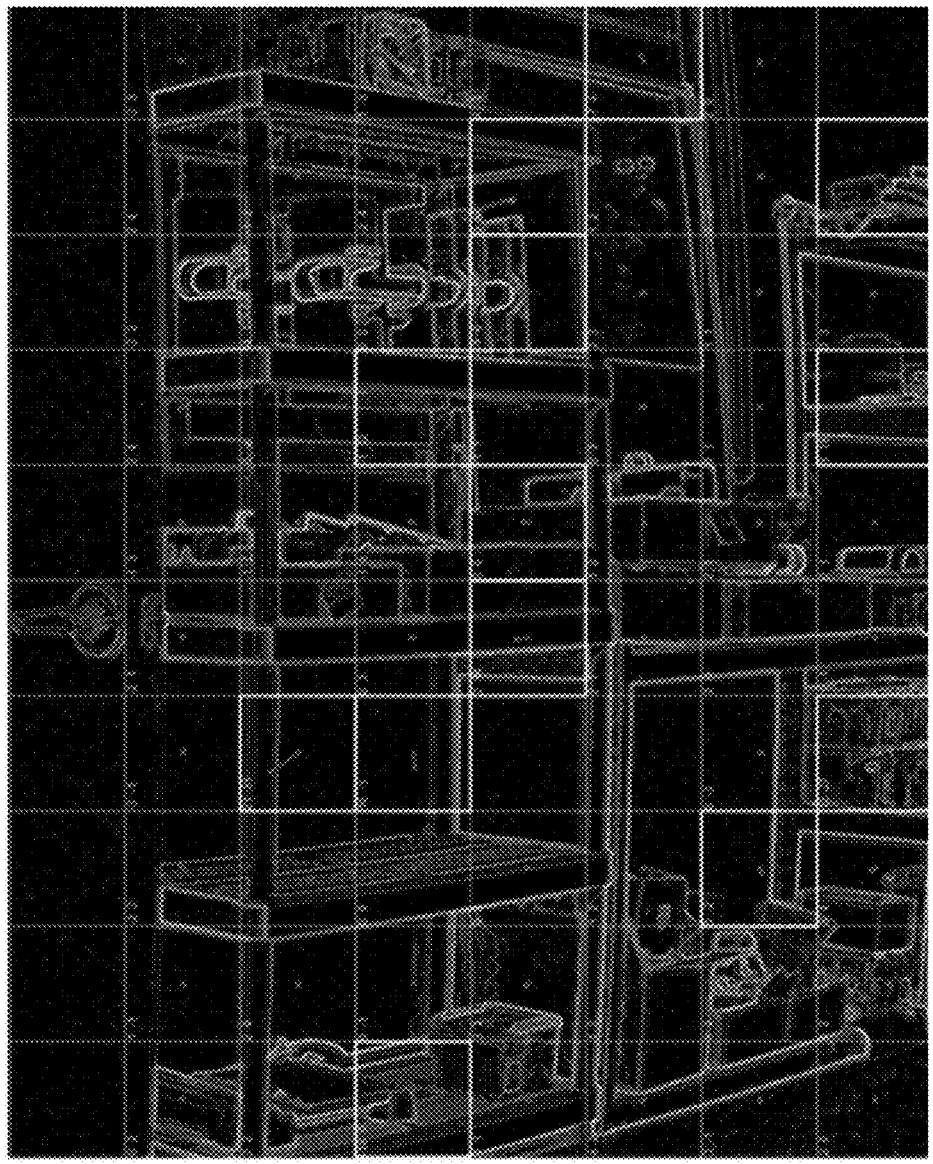
FIG. 8 depicts a result of finding displacements on an internal grid of 128 pixels according to an embodiment.
Figure 9:
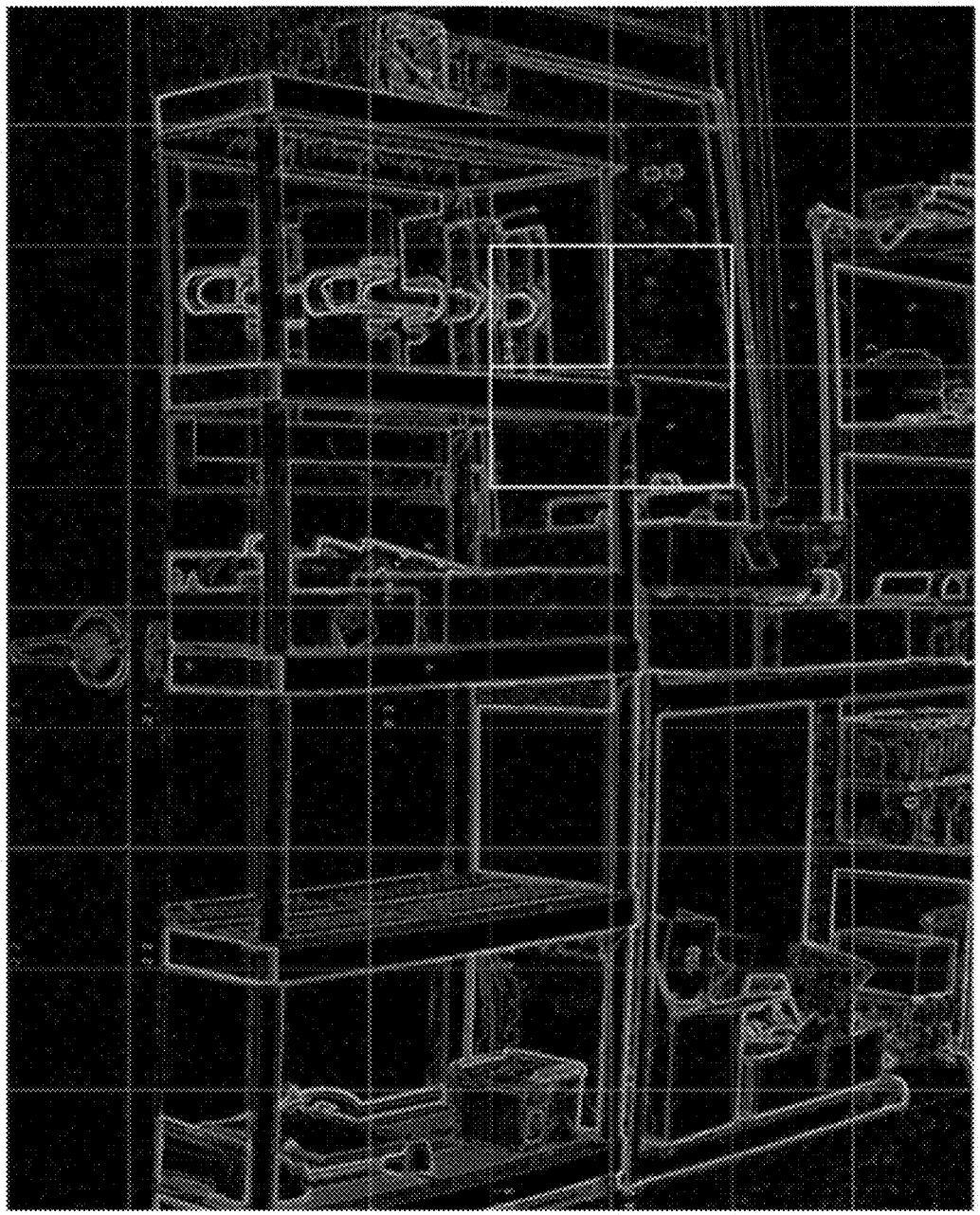
FIG. 9 depicts an example of the results of filtering found offset vectors according to an embodiment.
Figure 10:
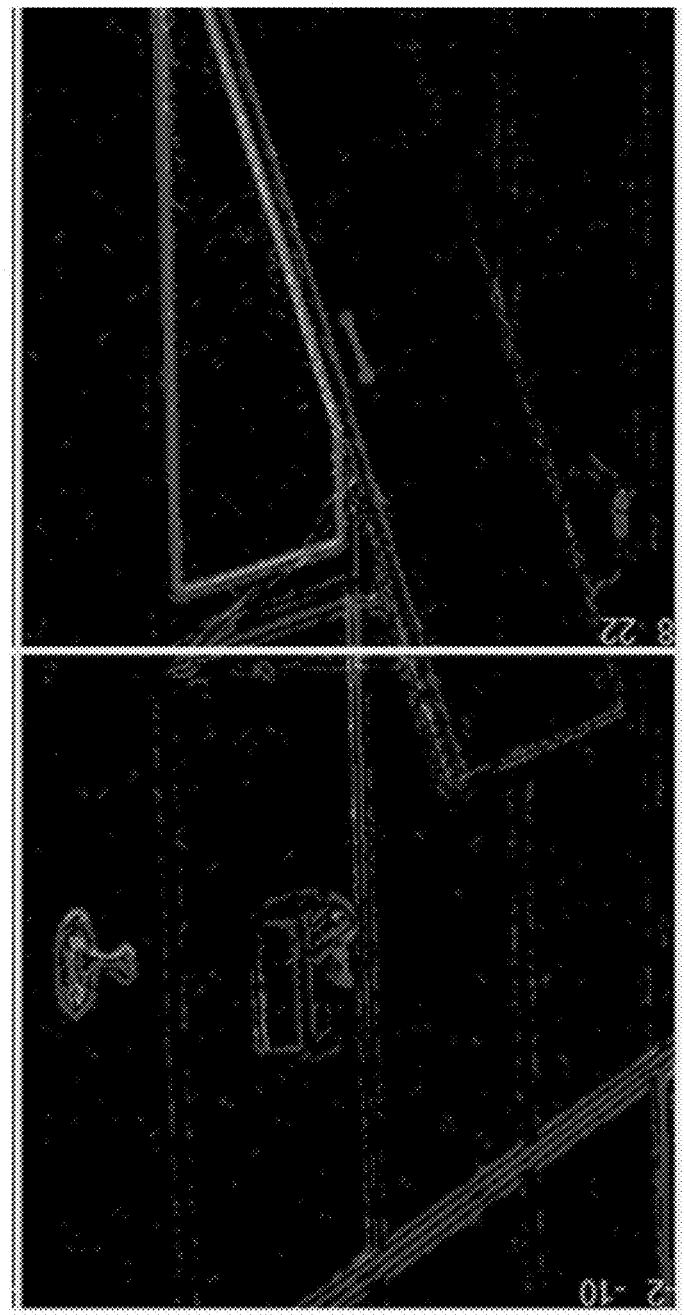
FIG. 10 depicts an example of an incorrectly found offset vector in a specific grid cell according to an embodiment.
Figure 11:
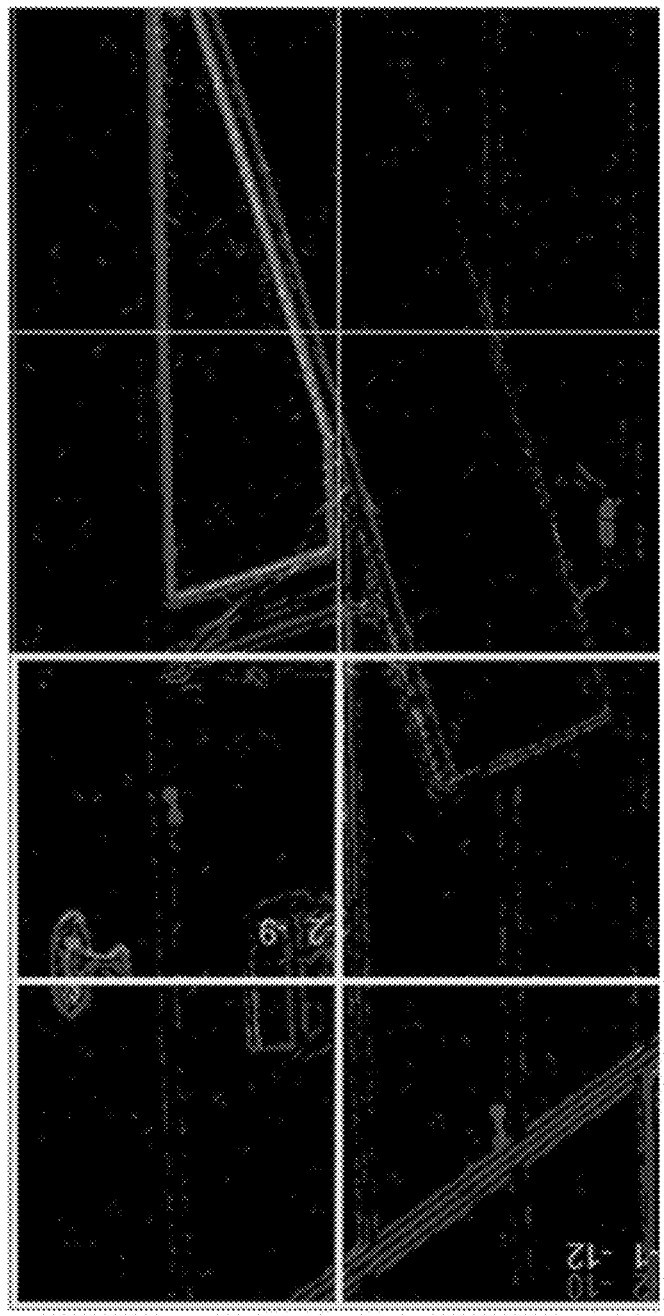
FIG. 11 depicts an example of a result of filtering on a sub grid according to an embodiment.

FIG. 6 depicts an example of edges from color data (Green) and intensity data (Red) that show offset vectors within grid cells before recalibration of the images. FIG. 7 depicts an example of finding displacements on a base grid of 256 pixels after a first recalibration. FIG. 8 depicts a result of finding displacements on an internal grid of 128 pixels. FIG. 9 depicts an example of the results of filtering the found offset vectors. FIG. 10 depicts an example of an incorrectly found offset vector in the base grid. FIG. 11 depicts an example of a result of filtering on the sub grid—as cells that show no displacement vector were filtered out.

At act A170, new calibration parameters are calculated from offset vectors for each of the correlated edges from act A160. The calibration parameters may be calculated as described below. In an embodiment, the output is a matrix or set of offset vectors that should be applied to one of the sets of data to correctly align or map, for example, the color from the camera data to the point cloud data or intensity image of the LIDAR data. Correlations between points that are present in color and in intensity image are not searched as done in factory calibration and in published algorithms on camera to LIDAR mapping calibration. Rather, the offset vectors of multiple patches are used to calculate the calibration parameters. As discussed above, the calibration parameters calculated at act A170 may be used as the calibration dataset at act A110, such that the method may be repeated using the calibration parameters calculated at act A170.

Steps A140 to A170 may be repeated as necessary to achieve the required mapping quality. A goal of the calibration procedure is to find a transformation matrix—that is also referred to as external calibration parameters, and internal calibration parameters that include mapping function parameters and distortion parameters—for example the radial distortion parameters. During the production image mapping it may also be necessary to find an angle that defines camera rotation relative to scan coordinate system for the first image. Initially the angle is identified by selecting some feature on the first shot and same feature on the scan intensity image. In an embodiment, this is done manually or automatically.

The following notations and definitions may be used in one embodiment by an algorithm provided by the processing unit 107:

External Parameters Calibration Notations $M_k$ is the camera transformation matrix with respect to the scan coordinate system, corresponding to its k-frame (k= $\overline{1:N_{img}}$) obtained by the algorithm of matching the markers on the images with the markers on the scan.

$\Delta_{\varphi 1}$ is the azimuthal angle of camera rotation in relation to the scan coordinate system for the first image (k=1).

$\varphi_{step\_k}$ is a step of the azimuth angle, i.e., the angle of rotation of the camera coordinate system around the axis $z_c$ between image k and k-1, found from transformation matrices $M_k$ obtained by matching markers on the images with markers on the scan.

$\varphi_{step\_avg}$ is the averaged step of the azimuthal angle of rotation between images.

$\Delta_{\varphi k} = \varphi_{step\_k} - \varphi_{step\_avg}$ is the variation of camera azimuth rotation angle corresponding to k-th frame (k=$\overline{1:N_{img}}$).

$\Phi_k$ is the full azimuth angle of rotation corresponding to k-frame (k=$\overline{1:N_{img}}$) i.e., the angle of rotation of the camera coordinate system around the axis $$z_c \varphi_k = \varphi_{step\_ang} * (k-1) + \sum_{i=2}^{k} (\Delta \varphi_i) + \Delta \varphi_1.$$

During calibration this angle is calculated from markers match. During production shots $\Delta \varphi_k$ is calculated using a procedure referred to as the "Improve camera position" procedure.

Rot($\varphi_k$) is a matrix of the camera coordinate system rotation by the azimuth angle by the value $\varphi_k$.

Calib$_k$ is the camera transformation matrix obtained from its k-th frame, (k=$\overline{1:N_{img}}$).

Calib is the optimal camera transformation matrix—referenced below as External Calibration matrix or just Calibration matrix.

The goal of the calibration procedure is to find Calib matrix—that is also referred to as External calibration parameters, and Internal calibration parameters that include mapping function parameters and radial distortion parameters.

During the production image mapping it may also be necessary to find angle $\Delta \varphi_1$ that defines camera rotation relative to the scan coordinate system for the first image. Initially the angle is identified by selecting some feature on the first shot and the same feature on the scan intensity image. In an embodiment, this is done manually by selecting some feature on both the intensity and color image on the first color image.

In an embodiment, the internal parameters of a nodal camera for production images are refined after application of Improve Camera Position algorithm, which results in refined position matrices for each nodal camera image. An example algorithm of finding points necessary for recalibration of nodal camera's production images is described below.

Each camera image CImg$_k$ in gray scale or in selected color representation is processed to select the edges and obtain an image with edges ECImg$_k$. Different Edge detection algorithms may be used—for example Canny Edge detection algorithm. Accuracy of the recalibration may depend on the edge detection algorithm and on filters applied to image with edges to reduce noise.

For all 3D points that are within the field of view of $Image_k$, also referred to as $SImg_k$, the image with edges $EsImg_k=GetEdges(SImg_k)$ is created and $ECImg_k=GetEdges(CImg_k)$ are generated. As a result, two sets of images with edges are obtained: the edges obtained from the camera images and the edges projected onto the camera images from the intensity channel of scan 3D points.

The images with edges, generated from $CImg_k$ and $SImg_k$, are split to a grid, each cell of which is considered as a separate sub-image. The grid cell size is defined as $2^N$, where N is an integer. The standard size of a base grid cell is 256×256 pixels but may be adjusted to select the best grid for specific scene.

At this stage the (mutual) image correlation matrix is computed from $ECImg_k$ and $EsImg_k$ for each grid cell of size $2^N$. The correlation matrix $Corr_k$ may effectively be calculated as follows:

$$Corr_k(ECImg_k, ESImg_k)=DFT_2^{-1}(DFT_2(ECImg_k)\cdot \overline{DFT_2(ESImg_k)}).$$

The resulting correlation matrix $Corr_k(ECImg_k, ESImg_k)=[corr_{du,dv}]_{du=0,NX-1}^{du=0,NX-1}$ characterizes all possible (du,dv)—shifts of the image $ESImg_k$ relative to the image $ECImg_k$. Its element $corr_{du,dv}$ determines the degree of correlation of the images $Shift_{du,dv}(ESImg_k)$ and $ECImg_k$.

For each grid cell the offset (du, dv) is calculated such that the correlation between $ESImg_k$ and $ECImg_k$ is maximal.

The symbol $Shift_{du,dv}$ (Img) indicates an image that is obtained from an image Img by shifting all its pixels in the direction of the axis u by the value du and, respectively, along the axis v by the value dv.

The maximum element of the correlation matrix $corr_{du^{max},dv^{max}}$ $Corr_k(ECImg_k, ESImg_k)$ determines the shift vector on the picture plane, at which the images with edges are as close as possible, i.e.

$$corr_{du^{max},dv^{max}}:=\max\{corr_{du,dv}:0\leq du<NX, 0\leq dv<NY\}.$$

Thus, the images $ECImg_k$ and $Shift_{du^{max},dv^{max}}$ $(ESImg_k)$ are as close as possible in the sense of the location of the edges. By the value of the vector $Shift(du^{max}, dv^{max})$ the displacement between the edges from the image and from the scan may be judged. The $Shift(du^{max}, dv^{max})$ matrix of offsets found on the base grid may be denoted as $MShift_{base}(du, dv)$.

The shifts are found on the internal grid with cell size $2^{N-1}$, where N is an integer. The matrix of displacements may be denoted as $Shift(du^{max}, dv^{max})$ found on the inner grid as $MShift_{inner}(du, dv)$.

The next step is to filter offsets by base and internal grid: $MShift(du, dv)=FiltShifts(MShift_{base}(du, dv), MShift_{inner}(du, dv))$.

The criteria for filtering displacements between the camera data and scan edges include the following:

Allowed percentage of colored pixels in each grid cell, working range: 50-80%. Offsets found in grid cells in which the percentage of shaded pixels exceeds the specified value will not be considered as too noisy areas.

Maximum permissible length difference of displacement vectors found in the base grid cell and inner grid cells inside it, working range: 2-5 pixels.

The maximum permissible angle between the displacement vectors found in the base grid cell and the inner grid cells inside it, working range: 5-20 degrees.

Normalized value of minimum radius (in range [0 . . . 1]), at which the displacements found on both grids will be accepted. For an area located at a smaller distance from the image center, the displacements found only on the base grid will be accepted. This parameter is needed to improve the quality of point cloud coloring in those areas that are in the peripheral part of the image.

At the next stage on the resulting MShift matrix (du, dv) pixel coordinates of the center of each filtered cell are found. These coordinates are taken as coordinates of a point on the camera image, which later will be used for nodal camera recalibration. Let $M_c(u, v)$ be a point on the camera image in the center of some filtered cell, then the corresponding point on the image with edges from the scan has coordinates $M_s(u+du, v+dv)$. The point $M_s(u+du, v+dv)$ on the image with edges from the scan is corresponded to some point $P_s(x, y, z)$ known from step 2, which is a 3D-projection of the point $M_s(u+du, v+dv)$ on the scan. It should be noted that to increase the number of points during recalibration of a nodal camera instead of one central point it is possible to use a set of points inside each filtered cell of a base and inner grid.

Thus, the set of point pairs $M_c$ (u, v) and $P_s$ (x, y, z) is analogous to the set of marker pairs on the images and in the scan during factory camera calibration and can be used during recalibration of a nodal camera on production images.

Once the new calibration parameters are calculated the process may be repeated as needed.

In an embodiment, a method includes:

Step 1—calculate the intensity edges in the scan intensity image and in the color image.

Step 2—provide initial mapping of the segments from the scan intensity image to the camera image using initial (e.g., Factory) Calibration dataset. The order of Step 1 and Step 2 may be different.

Step 3—generate fragmentation of the color and scan intensity images—for example using some rectangular grid.

Step 4—calculate correlation between intensity image edges and camera image edges using Fast Fourier Transform algorithm and find segments' offset to provide maximum correlation.

Step 5—using offsets for all segments (possibly with filtering to exclude segments with low count of edge pixels) calculate new calibration parameters.

Steps 3 to 5 may be repeated to achieve the required mapping quality.

Some critical differences to existing arts include, but are not limited to:

Algorithms that are using edge correlation work with external (extrinsic) camera calibration parameters—but embodiments disclosed herein calibrate internal (intrinsic) parameters that usually requires more points correlations.

Embodiments disclosed herein do not search correlations between points that are present in color and in intensity image as done in Factory Calibration and in published algorithms on Camera to LIDAR mapping calibration, but instead embodiments disclosed herein use the offsets of multiple patches, possibly assigned to some sample points in the patches.

Herein, the phrase "coupled with" is defined to mean directly connected to or indirectly connected through one or more intermediate components. Such intermediate components may include both hardware and software-based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The term "computer-readable medium" includes a single medium or multiple medium, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionalities as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in the specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

As used in the application, the term 'circuitry' or 'circuit' refers to all of the following: (a)hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may be a non-transitory medium such as a ROM, RAM, flash memory, etc. The processor and the memory may be supplemented by, or incorporated in, special purpose logic circuitry.

To provide for interaction with a user, embodiments of the subject matter described in this specification may be implemented on a device having a display, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the subject matter described in this specification may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the subject matter described in this specification, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those having ordinary skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those having ordinary skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The invention claimed is:

1. A camera system comprising:
a frame;
a camera rig mountable to the frame;
a camera attachable to the camera rig, the camera configured to acquire a camera image of an object or a scene;
a LIDAR scanner mountable to the frame, the LIDAR scanner configured to acquire LIDAR data of the object or the scene; and
a processing unit configured to use calibration parameters to combine the camera image and the LIDAR data by mapping data from the camera image and the LIDAR data from the LIDAR scanner to a common coordinate system, wherein the processing unit is configured to generate the calibration parameters by:
partitioning each of the camera image and the LIDAR data into a plurality of cells;
performing an initial mapping between the plurality of cells in the camera image and the plurality of cells in the LIDAR data;
detecting edges in the camera image and the LIDAR data;
calculating offset vectors for the detected edges in each of the cells between the camera image and the LIDAR data mapped to the common coordinate system; and
determining the calibration parameters based on the calculated offset vectors;
wherein the camera is configured to be removed from the camera rig and replaced by the LIDAR scanner at a same position.

2. The camera system of claim 1, wherein the LIDAR data comprises a point cloud.

3. The camera system of claim 1, wherein the initial mapping comprises mapping using previous calibration parameters generated using a special calibration scene.

4. The camera system of claim 1, wherein partitioning comprises partitioning using a grid.

5. The camera system of claim 1, wherein detecting edges comprises using at least one of a Canny edge detection algorithm, thresholding, edge thinning, or image gradients.

6. The camera system of claim 1, wherein the processing unit is further configured to generate the calibration parameters by:
excluding one or more cells of the plurality of cells based on a content of the one or more cells of the plurality of cells.

7. The camera system of claim 1, wherein the processing unit is further configured to generate the calibration parameters by:
transforming the LIDAR data into an intensity image that is partitioned into the plurality of cells.

8. The camera system of claim 1, wherein the offset vectors are used to calculate calibration parameters such that when used to map color and intensity to a common coordinate system, the offset vectors are minimized.

9. The camera system of claim 1, wherein the processing unit is further configured to repeat the steps of detecting, calculating, and determining for more than one iteration, wherein the initial mapping uses calibration parameters from a previous iteration.

10. A method for calibrating a nodal camera system, the method comprising:
determining an initial calibration of the nodal camera system, wherein the nodal camera system comprises a camera, a LIDAR scanner, and a rig, wherein the camera and LIDAR scanner are configured to be mounted on the rig at a same position;
acquiring a camera image and LIDAR data of an object or a scene;
partitioning each of the camera image and the LIDAR data into a plurality of cells;
mapping cells of the camera image with cells of the LIDAR data using parameters from the initial calibration;
detecting edges in the camera image and the LIDAR data;
calculating offset vectors for the detected edges in each of the mapped cells; and
determining calibration parameters for the nodal camera system based on the calculated offset vectors.

11. The method of claim 10, wherein the initial calibration is determined using calibration parameters determined using a special calibration scene.

12. The method of claim 10, wherein the LIDAR data comprises an intensity image.

13. The method of claim 10, wherein detecting edges comprises detecting edges using an edge detection algorithm comprising at least one of a Canny edge detection algorithm, thresholding, edge thinning, or image gradients.

14. The method of claim 10, further comprising:
excluding one or more of the plurality of cells that do not include an edge.

15. The method of claim 10, further comprising:
repeating the partitioning, mapping, detecting, calculating, and determining for a plurality of iterations, wherein the initial calibration is performed using calibration parameters from a previous iteration.

16. The method of claim 10, wherein the offset vectors are used to calculate the calibration parameters such that when used to map color and intensity of the camera image and LIDAR data to a common coordinate system, the offset vectors are minimized.

17. The method of claim 10, wherein acquiring the camera image and the LIDAR data comprises:
mounting the camera configured to acquire the camera image on the rig;
acquiring the camera image;
mounting the LIDAR scanner configured to acquire the LIDAR data on the rig at a same position that the camera was mounted at; and
acquiring the LIDAR data.

18. The method of claim 10, wherein calculation of the calibration parameters comprises a plurality of shift values such that when the calibration parameters are applied to mapping, newly calculated offset vectors have smaller magnitudes.

19. A method for calibrating a nodal camera system, the method comprising:
determining an initial calibration of the nodal camera system;
acquiring a camera image and LIDAR data of an object or a scene;
partitioning each of the camera image and the LIDAR data into a plurality of cells;
mapping cells of the camera image with cells of the LIDAR data using parameters from the initial calibration;
detecting edges in the camera image and the LIDAR data;
excluding one or more of the plurality of cells that do not include an edge;
calculating offset vectors for the detected edges in each of the mapped cells; and determining calibration parameters for the nodal camera system based on the calculated offset vectors.

* * * * *